US006614952B2

(12) United States Patent
Nishimura

(10) Patent No.: US 6,614,952 B2
(45) Date of Patent: Sep. 2, 2003

(54) PROGRAMMABLE OPTICAL CROSS-CONNECTOR USING AN ARRAY OF INTERSECTING WAVEGUIDES

(75) Inventor: Ken A. Nishimura, Freemont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/027,581

(22) Filed: Oct. 19, 2001

(65) Prior Publication Data
US 2003/0077024 A1 Apr. 24, 2003

(51) Int. Cl.[7] ............................. G02B 6/26; G02B 6/42
(52) U.S. Cl. ........................... 385/17; 385/18; 385/47; 385/50
(58) Field of Search ................. 385/16–23, 27, 385/39, 44, 45, 47, 46, 48, 50, 51, 15

(56) References Cited

U.S. PATENT DOCUMENTS

| 4,575,180 A | * | 3/1986 | Chang | 385/47 |
| 4,630,883 A | * | 12/1986 | Taylor et al. | 385/47 |
| 4,888,785 A | * | 12/1989 | Lee | 372/50 |
| 4,988,157 A | * | 1/1991 | Jackel et al. | 385/17 |
| 5,040,864 A | * | 8/1991 | Hong | 385/16 |
| 5,825,952 A | * | 10/1998 | Kawanishi et al. | 385/47 |

* cited by examiner

Primary Examiner—Hemang Sanghavi
Assistant Examiner—Scott A Knauss

(57) ABSTRACT

A programmable optical waveguide cross-connection array including a supporting substrate, one or more first waveguides fixed to the supporting substrate, one or more second waveguides fixed to the supporting substrate and disposed to form one or more intersections with the first waveguides, and an optical boundary or cavity in at least one switched intersection; whereby the optical signal entering the switched intersection from a first waveguide is redirected by the cavity to exit the switched intersection by way of the second waveguide. The device embodies a network of intersecting waveguides in which cross-connections between selected waveguide pairs can be permanently programmed at low cost. The programmable optical substrate provides customized local connectivity between a plurality of optical components and may be efficiently and reliably fabricated in large quantities.

19 Claims, 4 Drawing Sheets

PROGRAMMABLE OPTICAL CROSS-CONNECTOR USING AN ARRAY OF INTERSECTING WAVEGUIDES

BACKGROUND OF THE INVENTION

1. Field of the Invention

This invention relates generally to programmable interconnection arrays and more particularly to an optical waveguide cross-connect array with programmable connections.

2. Description of the Related Art

Long-range signal communication over optical fiber is gradually displacing the more traditional electronic or radio-wave transmission. Originally, optical fibers were used mainly for high-density, long-haul applications in which electrical signals representing data were used to modulate a laser at one end of the fiber. The light received at the other end of the fiber was detected and converted to an electrical signal in the detection process. Such a process avoided switching an optical signal between selected fibers because the electrical signals derived from the optical signals could be switched conventionally and then reconverted to optical form for a long-range retransmission on another fiber. However, modern optical fiber signal transfer is also applied to numerous medium and short haul communication links and efficiency now demands extensive optical cross-connect switching for signal routing. A switching matrix that uses bubble manipulation in a liquid to control signal paths has yielded very positive results but long-term reliability has not been verified for large-scale bubble switching matrices. Other types of optical switches are commercially available, but suffer from one or more of cost efficiency, unwieldy size, poor performance, or a known lack of long-term reliability.

Similarly, the local transfer of signals to and from an integrated signal processing device such as an integrated circuit (IC) is usually accomplished by electrical means. Because of the physical limitations of both the circuitry and the signal transfer media, the very high speed communication devices expected in the near future must use optical signaling and interconnections for acceptable information transfer efficiency. A typical means for high-performance local electrical signal transfer and interconnection is the modern high-density printed circuit board (PCB). In a PCB, the electrical signals are routed on thin conductors, separated laterally and vertically by an insulating dielectric. Photolithographic techniques are used to render the pattern of conductors on each layer, and the layers are laminated to form a three-dimensional electrical interconnection array. Interconnections between vertically separated layers are added to ensure maximum interconnection density.

Optical equivalents of the modern high-density PCB are not known in the art. In particular, the manufacture of high-density customized interconnections using optical waveguides is widely believed to be difficult and impractical. What is needed is an apparatus and procedure to provide a programmable set of interconnected optical paths on a substrate suitable for the cost-effective implementation of customized optical interconnections for local signal transfer. The related unresolved problems and deficiencies are clearly felt in the art and are solved by this invention in the manner described below.

SUMMARY OF THE INVENTION

This invention solves the optical interconnection efficiency problem by providing a mass-produced substrate containing a network of intersecting optical waveguides in which a permanent cavity may be created at any one or more intersections to permanently cross-connect the two intersecting waveguides, thereby producing a permanent custom optical interconnection.

The present invention provides a process for mass-producing devices embodying a network of intersecting waveguides in which cross-connections between selected waveguide pairs can be permanently programmed at low cost using automated equipment. It is a feature and an advantage of this invention that programmable optical substrates providing customized local connectivity between a plurality of optical components may be efficiently and reliably fabricated.

one aspect, the invention is a process for fabricating an optical waveguide cross-connection array, including the steps of preparing a supporting substrate, forming one or more first waveguides fixed to the supporting substrate, forming one or more second waveguides fixed to the supporting substrate and disposed to form one or more intersections with the first waveguides, selecting at least one intersection to be switched, and changing the optical parameters at the selected intersection, whereby the optical signal entering the selected waveguide intersection from a first waveguide is redirected to exit the selected waveguide intersection by way of the second waveguide.

In another aspect, the invention is a method for programming, according to an interconnection map, an optical waveguide cross-connection array having a plurality of waveguides fixed to a supporting substrate to form one or more waveguide intersections, including the steps of selecting at least one waveguide intersection to be switched according to the interconnection map, and creating a permanent cavity having a second refractive index in the waveguide material of the selected waveguide intersection, whereby the optical signal entering the selected intersection from the first waveguide is deflected by the cavity to exit the selected intersection by way of the second waveguide.

In an exemplary embodiment, the invention is a programmable optical waveguide cross-connection array including a supporting substrate, one or more first waveguides fixed to the supporting substrate, one or more second waveguides fixed to the supporting substrate and disposed to form one or more intersections with the first waveguides, and a cavity in at least one of the intersections at least partially empty of all material other than gas, whereby the optical signal entering the at least one intersection from a first waveguide is redirected by the cavity to exit by way of the second waveguide.

The programmable optical waveguide cross-connection array of this invention for the first time provides an optical equivalent of the modern high-density PCB featuring a high-density customized interconnections using optical waveguides that is relatively inexpensive and easy to manufacture while providing the necessary reliability required for modern optical networks. Programming of individual arrays can be automated and is permanently fixed in the array so that the array of this invention for the first time provides a low-cost mass-produced device featuring permanent customized optical interconnections for local signal transfer.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DETAILED DESCRIPTION

Useful techniques for embedding polymer waveguides in a supporting substrate are well known in the art. For example, in U.S. Pat. No. 5,500,914, incorporated herein by this reference, Barbara Foley et al. mention spinning a polymeric film onto a substrate and exposing portions thereof to light to create a waveguide by changing the refractive index of the polymeric film. For another example, in U.S. Pat. No. 5,854,868, incorporated herein by this reference, Yoshimura et al. disclose a process for fabricating optical waveguides by forming a refractive index distribution pattern and/or waveguide pattern on a substrate. For yet another example, refer to U.S. Pat. No. 5,540,346, incorporated herein by this reference, in which Fujimoto et al. describe a method of making integrated circuit waveguides using an active waveguide polymer. Such methods may be adapted without undue experimentation for creating a mesh of intersecting polymer waveguides to provide a large set of possible interconnection points. For example, an N-by-N orthogonal polymer waveguide mesh providing $N^2$ potential interconnection points may be fabricated according to any of such useful methods known in the art.

Two intersecting polymer waveguides provide two independent optical paths. Because of the physics of optical signal waveguide propagation, two independent optical signals traveling through intersecting waveguides do not mix at the waveguide intersection. However, if a suitable discontinuity is provided at the waveguide intersection, the two independent optical signals interact with the discontinuity so that each signal exits the intersection on the other waveguide; that is, the two signals interchange waveguides so that the signal arriving on waveguide A exits on waveguide B and vice versa. Suitable useful optical polymer materials are well-known in the art and include such materials as polyurethane, polycarbonate, acrylic polymer, and vinyl polymer. Acrylic polymers such as polymers of meth-acrylamides or polymers of alkyl-methacrylates such as polymethyl-methacrylate (PMMA) are useful at short wavelengths near the visible region (such as 850 nanometers).

Figure 1:
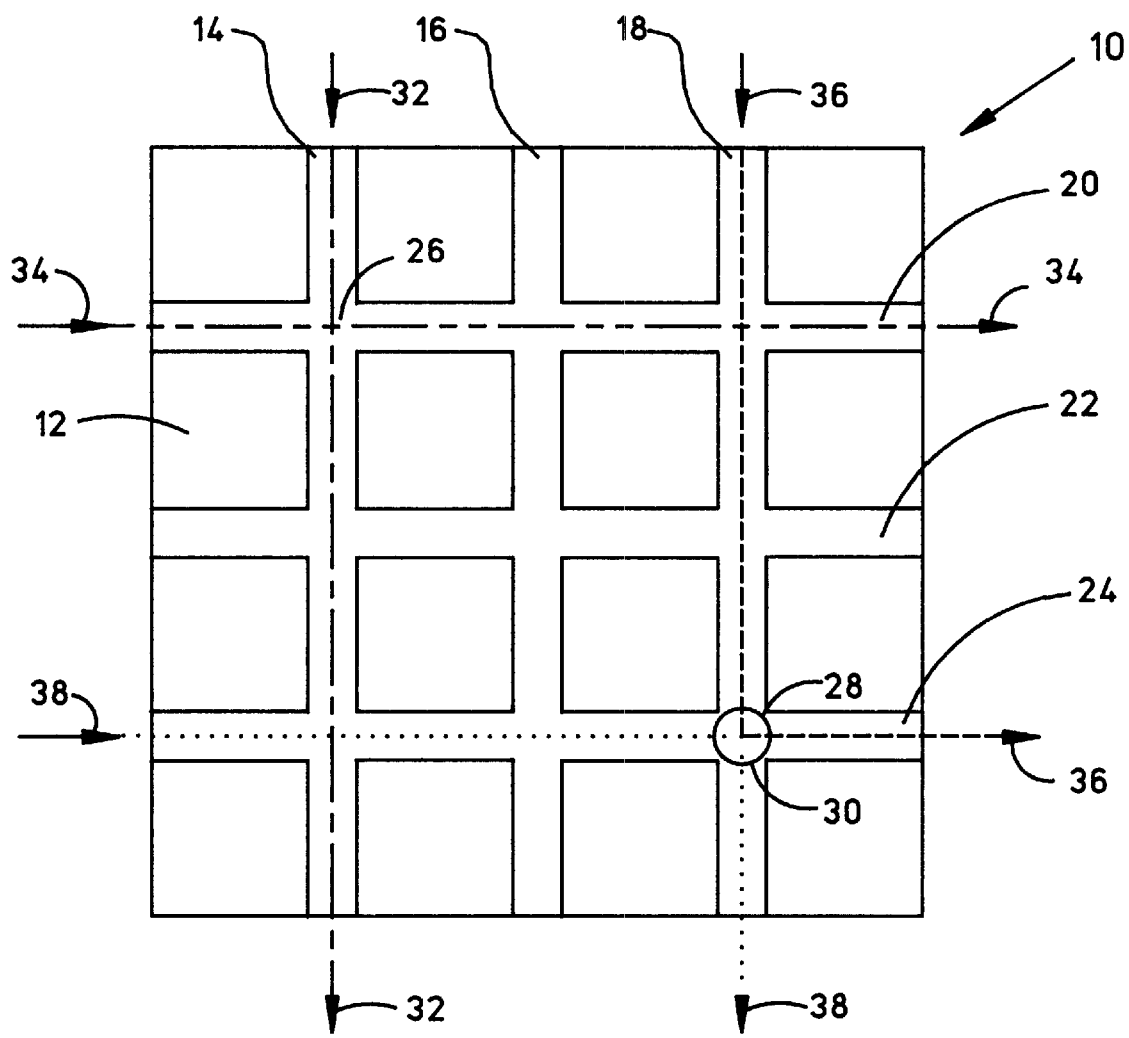
FIG. 1 illustrates a schematic diagram of an exemplary embodiment of the programmable optical waveguide cross-connection array of this invention.

FIG. 1 illustrates a schematic diagram of an exemplary embodiment of the programmable optical waveguide cross-connection array 10 of this invention. In array 10, a mesh of intersecting polymer waveguides contained within a substrate 12, in which the waveguides 14, 16 and 18 consist of a waveguide set in a first direction, and the waveguides 20, 22 and 24 consist of a waveguide set in a second direction generally orthogonal to the first direction. The intersections between these two waveguide sets form a plurality of potential connection points, exemplified by the unaltered (unswitched) intersection 26 between waveguides 14 and 20 and the altered (switched) intersection 28 between waveguides 18 and 24.

Each intersection in an unprogrammed embodiment (not shown) of optical waveguide cross-connection array 10 represents a possible interconnect point that may be altered or "switched." For example, intersection 26 may be altered to interconnect waveguides 14 and 20 if desired. Similarly, intersection 28 has already been altered to interconnect waveguides 18 and 24 by incorporating therein the cavity 30, which is at least partially empty of all material other than a gas at some pressure above absolute vacuum. Unaltered intersection 26 in this example allows light signals, represented by the arrows 32 and 34 in the respective waveguides 14 and 20 to travel unimpeded in their respective directions. Altered intersection 28 in this example is formed by inducing cavity 30 at a predetermined location within intersection 28 to interchange (switch) the directions of the light signals represented by the arrows 36 and 38, thereby rerouting light signal 36 entering on waveguide 18 to the exit of waveguide 24 and rerouting light signal 38 entering on waveguide 24 to the exit of waveguide 18. Any predetermined mapping of waveguide entrances into waveguide exits may be reduced to a predetermined pattern of intersection alterations according to this invention.

Figure 2:
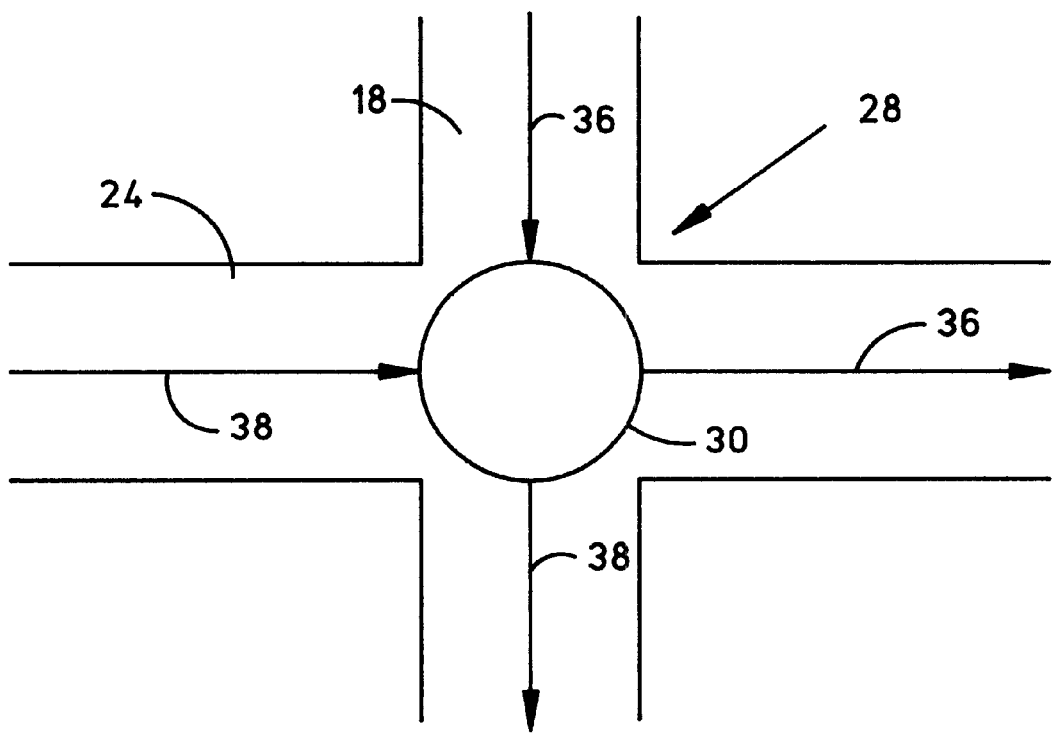
FIG. 2 illustrates a schematic diagram showing details of an exemplary switched intersection from FIG. 1.

FIG. 2 shows a planar view of an embodiment of a discontinuity appropriate for altering intersection 28 to switch a light signal between waveguides 18 and 24. This discontinuity is embodied as cavity 30 created within the intersection of a pair of waveguides. According to the process of this invention for creating cavity 30, the polymer material inside cavity 30 is first heated quickly to a temperature sufficient to vaporize it briefly. The vapor pressure forces the cooler (but molten) surrounding polymer material aside until the cooling material again solidifies, leaving a generally spherical cavity containing essentially nothing other than traces of polymer vapor. This captured partial-vacuum-filled cavity 30 has an index of refraction less than that of the surrounding polymer material in waveguides 18 and 24. The symmetrically curved surface of cavity 30 accordingly causes optical signal 36 arriving on waveguide 18 to couple into and exit from waveguide 24 by way of complete internal reflection. Because of the general spherical symmetry of cavity 30, optical signal 38 entering on waveguide 24 similarly couples to waveguide 18 and exits therefrom.

Figure 3:
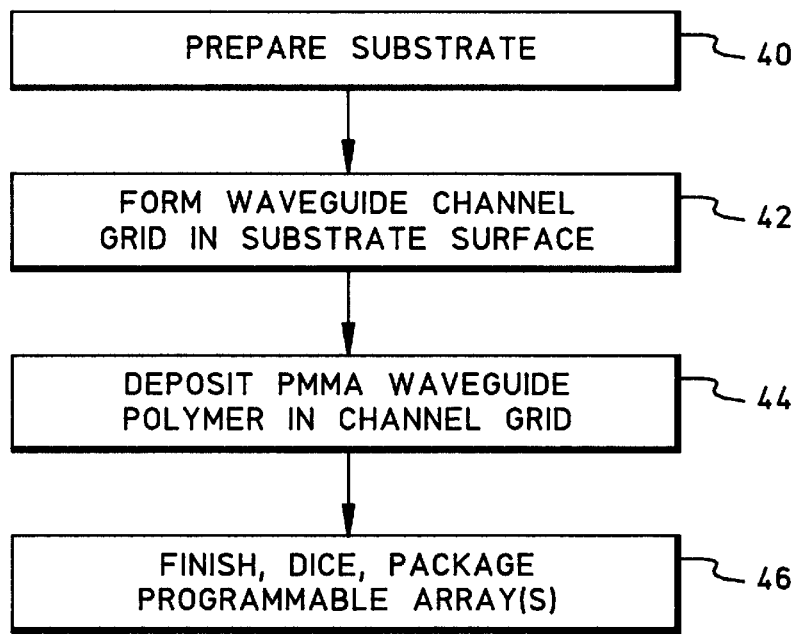
FIG. 3 is a block diagram of a flowchart showing an exemplary embodiment of the method of this invention for fabricating the programmable optical waveguide cross-connection array from FIG. 1.

FIG. 3 is a block diagram of a flowchart showing an exemplary embodiment of the method of this invention for fabricating the programmable optical waveguide cross-connection array from FIG. 1. In the first step 40, a substrate is prepared for the waveguide fabrication by smoothing and finishing as necessary. In the next step 42, the substrate surface is grooved to form a pattern of channels defining the grid of crossing waveguides (see FIG. 1, for example). In the following step 44, the waveguides are formed by depositing PMMA polymer material in the grooves of the substrate surface in any useful manner known in the art, resulting in a single large waveguide grid (mesh) having perhaps thousands or more waveguides in each of the two generally-orthogonal directions. In the final step 46, this single substrate is finished, diced, and packaged as desired to create a plurality of mass-produced "chips" or substrates each containing a network of intersecting optical waveguides which may be programmed by means of creating a permanent cavity at any one or more of the waveguide intersections to thereby permanently cross-connect selected waveguides in a permanent custom optical interconnection.

Figure 4:
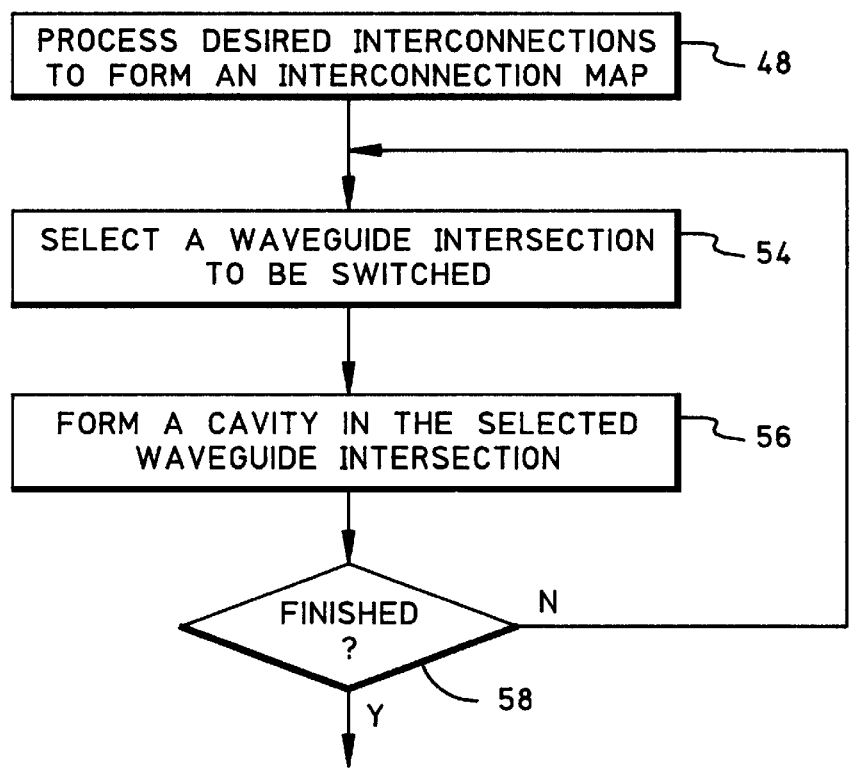
FIG. 4 is a block diagram of a flowchart showing an exemplary embodiment of the method of this invention for programming the programmable optical waveguide cross-connection array from FIG. 1.
Figure 5:
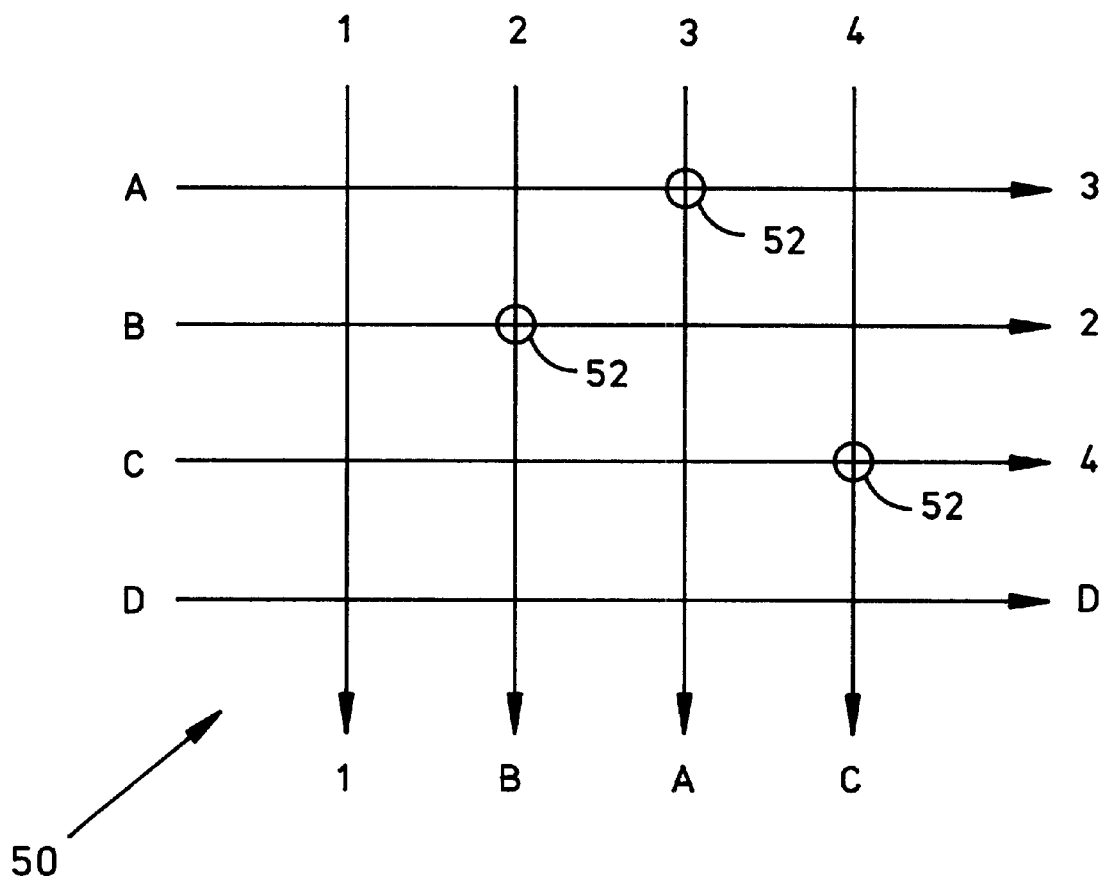
FIG. 5 is a schematic diagram illustrating an embodiment of an interconnection map suitable for use with the method from FIG. 4.

FIG. 4 is a block diagram of a flowchart showing an exemplary embodiment of the method of this invention for programming the programmable optical waveguide cross-connection array from FIG. 1. In the first step 48, the desired waveguide interconnections are processed to create an interconnection map such as the exemplary interconnection map 50 shown in FIG. 5, which may be understood with reference to the above discussion of FIG. 1. In FIG. 5, the desired interconnection scheme has been reduced to the three cavities 52 located essentially as shown. After map 50 has been created, the next step 54 selects one of the waveguide intersections that must be "switched" according to the interconnection map. In the example shown in FIG. 5, this would be any intersection 52. In the following step 56, a cavity is formed in the selected intersection using the method according to this invention discussed below. In the final step 58, the interconnection map is consulted for another intersection 52 and steps 54–58 are repeated recursively until the programming of the optical interconnect is completed.

An exemplary method of this invention for creating the requisite bubble or cavity at a waveguide intersection by anaerobic decomposition of the polymer is to focus a beam of electromagnetic energy from a laser of suitable frequency onto the intersection, thereby heating it sufficiently to briefly vaporize a small predetermined volume of the polymer material. The size and content of the resulting cavity can be controlled by selecting the characteristic parameters of the incident laser radiation. For example, a suitable pulse of radiation having a wavelength in the range of about 9 to about 11 microns, and preferably 10.6-microns, from a $CO_2$ (carbon-dioxide) laser may be focused to create a generally spherical cavity having a diameter in the range of about 5 to about 15 microns, and preferably 10 microns, at the intersection of two PMMA polymer waveguides. This in effect displaces a small amount (a few nanograms) of polymer material by pushing the surrounding material aside to leave a vacuum-filled cavity, the contents of which are expected to be near vacuum after condensation of the vapor. The optical properties of the cavity arise from the severe density change between solid polymer and gaseous/near vacuum cavity. The two important cavity properties are size and symmetry. Size is controlled by the amount of laser power used and the type of polymer material. Symmetry is necessary to insure that the optical path is predictable and is controllable because of the mechanics of bubble formation, which applies cavity-formation pressure equally in all dimensions to create a substantially-spherical cavity in uniform polymer material.

An alternative method of this invention for creating the requisite bubble or cavity at a waveguide intersection that does not rely on anaerobic decomposition relies instead on doping the polymer with a diazonium salt compound that decomposes to form nitrogen gas upon exposure to ultraviolet laser light. After decomposition, the nitrogen gas expands in the heated (molten) polymer material to form a cavity that remains after cooling. One useful technique is a two-step interconnect switch programming process where the first step exposes a photolithographic mask and the second step heats the regions covered by the mask to create bubble cavities. Another useful technique is to use a single high-power programming step that steers the focused laser to each location of the interconnection substrate to create a cavity as required without a masking step, such as described above in connection with FIG. 4.

In addition to the preferred method of creating a bubble or cavity to switch a selected waveguide intersection, the selected waveguide intersection may also be "switched" by changing the optical properties of the waveguide material itself. That is, local properties of the waveguide intersection material, such as light propagation velocity, for example, may be changed by any useful means, including, for example, mechanical stress, irradiation or heating, or some useful combination of these. For example, optical waveguide materials whose optical properties change either permanently or temporarily, responsive to, for example, ultraviolet irradiation having a wavelength in the range of about 4 to about 400 nanometers are well-known in the art. Also, for example, a polymer waveguide cross-connection array may be treated to mechanically stress all waveguide intersections before selected intersections are each then thermally heated (sufficiently to de-stress the intersection) and thereby "switched" by virtue of the resulting changes in the optical propagation velocity of the material at each selected intersection.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A process for fabricating an optical waveguide cross-connection array, the process comprising the steps of:
   (a) preparing a supporting substrate;
   (b) forming one or more first waveguides of a polymer material fixed to the supporting substrate;
   (c) forming one or more second waveguides of the polymer material fixed to the supporting substrate and disposed to form one or more intersections with the first waveguides;
   (d) selecting at least one intersection to be switched; and
   (e) creating a cavity having a non-planar reflecting surface in the polymer material at the selected intersection, whereby the optical signal entering the selected waveguide intersection from a first waveguide is redirected to exit the selected waveguide intersection by way of the second waveguide.

2. The process of claim 1 and further comprising the step of:
   (e.1) focusing electromagnetic energy on the switched intersection to vaporize a portion of the waveguide material to thereby create the cavity.

3. The process of claim 2 wherein:
   the electromagnetic energy includes radiation having a wavelength in the range of about 9 to about 11 microns.

4. The process of claim 1 wherein:
   the cavity is generally spherical and has a diameter in the range of about 5 to about 15 microns.

5. The process of claim 1 wherein the waveguides include at least one dopant material in the one or more intersections, the process further comprising the step of:
   (e.1) focusing electromagnetic energy on the switched intersection to decompose a portion of the dopant material.

6. The process of claim 5 wherein:
   the electromagnetic energy includes ultraviolet radiation having a wavelength in the range of about 4 to about 400 nanometers.

7. The process of claim 1 wherein the polymer material is selected from the group consisting of:

polyurethane, polycarbonate, acrylic polymer, vinyl polymer, and polymethyl-methacrylate (PMMA).

8. A method for programming, according to an interconnection map, an optical waveguide cross-connection array having a plurality of waveguides made of a polymer material having a first refractive index fixed to a supporting substrate to form one or more waveguide intersections, the method comprising the steps of:

(a) selecting at least one waveguide intersection to be switched according to the interconnection map; and (b) creating a permanent cavity having a second refractive index in the waveguide material of the selected waveguide intersection to provide a non-planar reflecting surface, whereby the optical signal entering the selected intersection from the first waveguide is deflected by the cavity to exit the selected intersection by way of the second.

9. The method of claim 8 further comprising the step of:

(b.1) focusing electromagnetic energy on the switched intersection to vaporize a portion of the waveguide material.

10. The process of claim 9 wherein:

the electromagnetic energy includes radiation having a wavelength in the range of about 9 to about 11 microns.

11. The process of claim 8 wherein the waveguides include at least one dopant material in the one or more intersections, the process further comprising the step of:

(b.1) focusing electromagnetic energy on the switched intersection to decompose a portion of the dopant material.

12. The process of claim 11 wherein:

the electromagnetic energy includes ultraviolet radiation having a wavelength in the range of about 4 to about 400 nanometers.

13. The process of claim 8 wherein the polymer material is selected from the group consisting of:

polyurethane, polycarbonate, acrylic polymer, vinyl polymer, and polymethyl-methacrylate (PMMA).

14. The process of claim 8 wherein:

the cavity is generally spherical and has a diameter in the range of about 5 to about 15 microns.

15. A programmable optical waveguide cross-connection array comprising:

a supporting substrate;

one or more first polymer waveguides fixed to the supporting substrate;

one or more second polymer waveguides fixed to the supporting substrate and disposed to form one or more intersections with the first waveguides; and a cavity in at least one of the intersections at least partially empty of all material other than gas and having a non-planar reflecting surface, whereby the optical signal entering the at least one intersection from a first waveguide is redirected by the cavity to exit by way of the second waveguide.

16. The array of claim 15 wherein the cavity comprises:

a region from which the waveguide material has been evaporated by focused electromagnetic energy.

17. The array of claim 16 wherein:

the electromagnetic energy includes radiation having a wavelength in the range of about 9 to about 11 microns.

18. The array of claim 15 wherein the polymer is selected from the group consisting of:

polyurethane, polycarbonate, acrylic polymer, vinyl polymer, and polymethyl-methacrylate (PMMA).

19. The array of claim 15 wherein:

the cavity is generally spherical and has a diameter in the range of about 5 to about 15 microns.

* * * * *